(No Model.) 3 Sheets—Sheet 1.
W. A. HOLLEY & U. MALIN.
ELECTRO MAGNETIC GRAIN SCALE.

No. 397,594. Patented Feb. 12, 1889.

Witnesses:
Jacob Ferris.
Grace M. Garrison

Inventors:
Wm A. Holley and
By Ulrik Malin
Edmund D. Barry
Atty.

(No Model.) 3 Sheets—Sheet 2.
W. A. HOLLEY & U. MALIN.
ELECTRO MAGNETIC GRAIN SCALE.
No. 397,594. Patented Feb. 12, 1889.
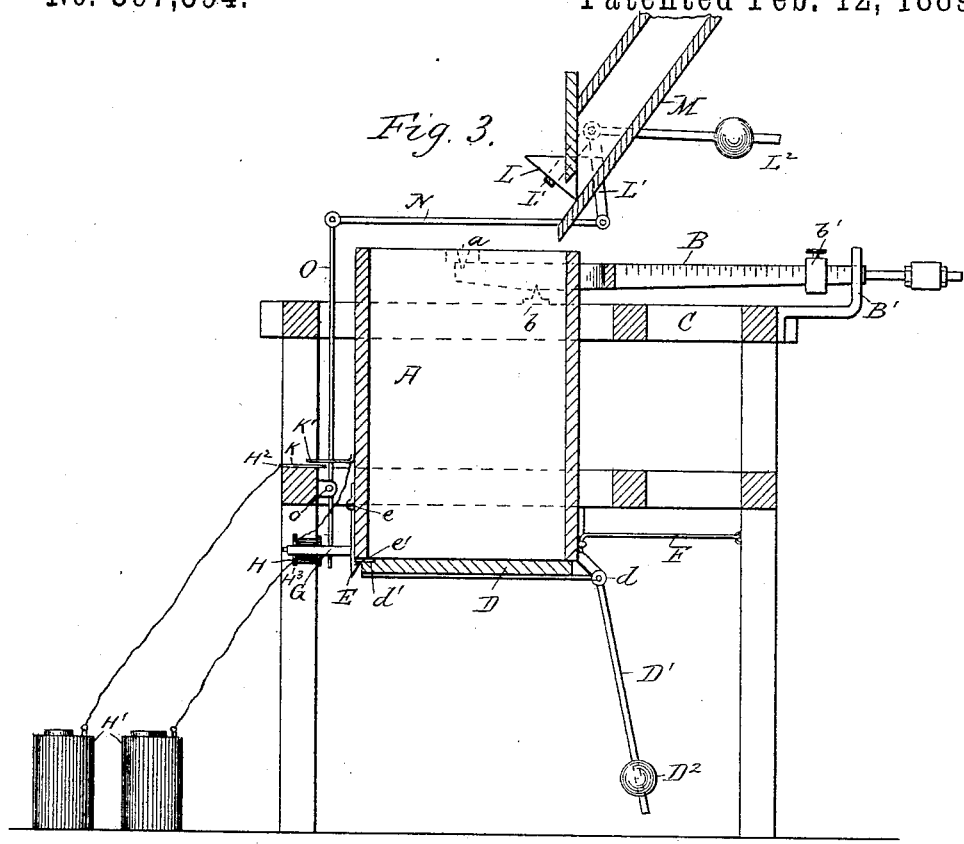
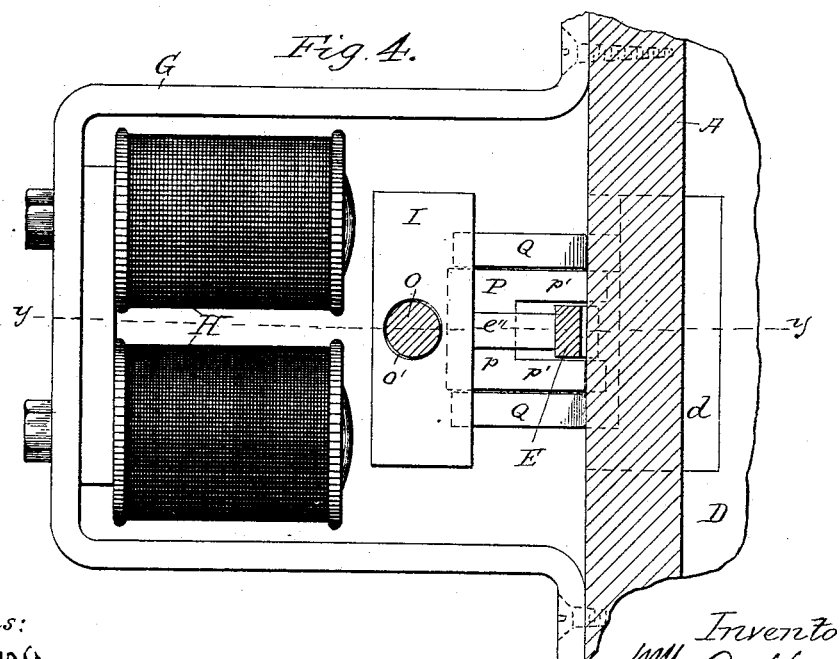

(No Model.) 3 Sheets—Sheet 3.
W. A. HOLLEY & U. MALIN.
ELECTRO MAGNETIC GRAIN SCALE.
No. 397,594. Patented Feb. 12, 1889.
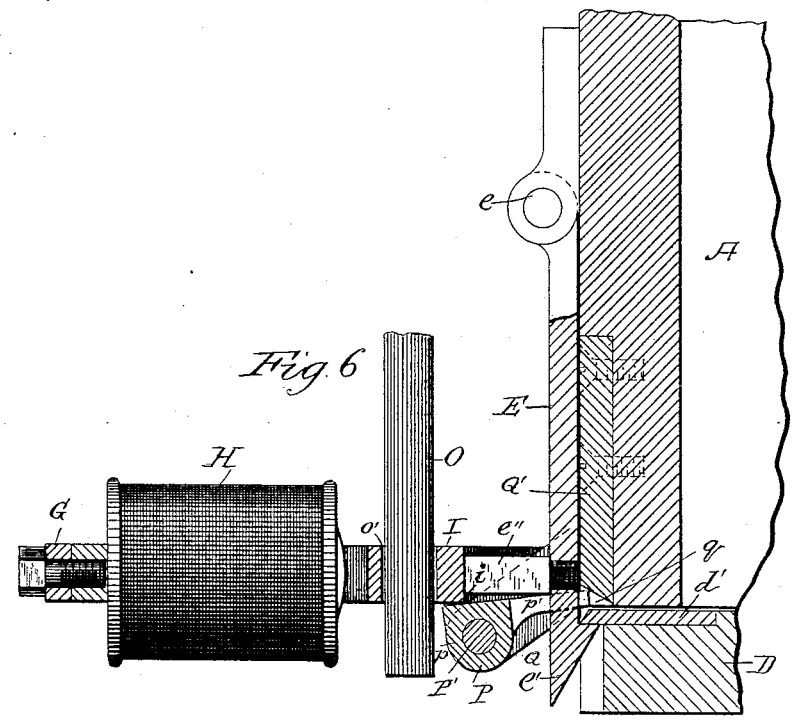
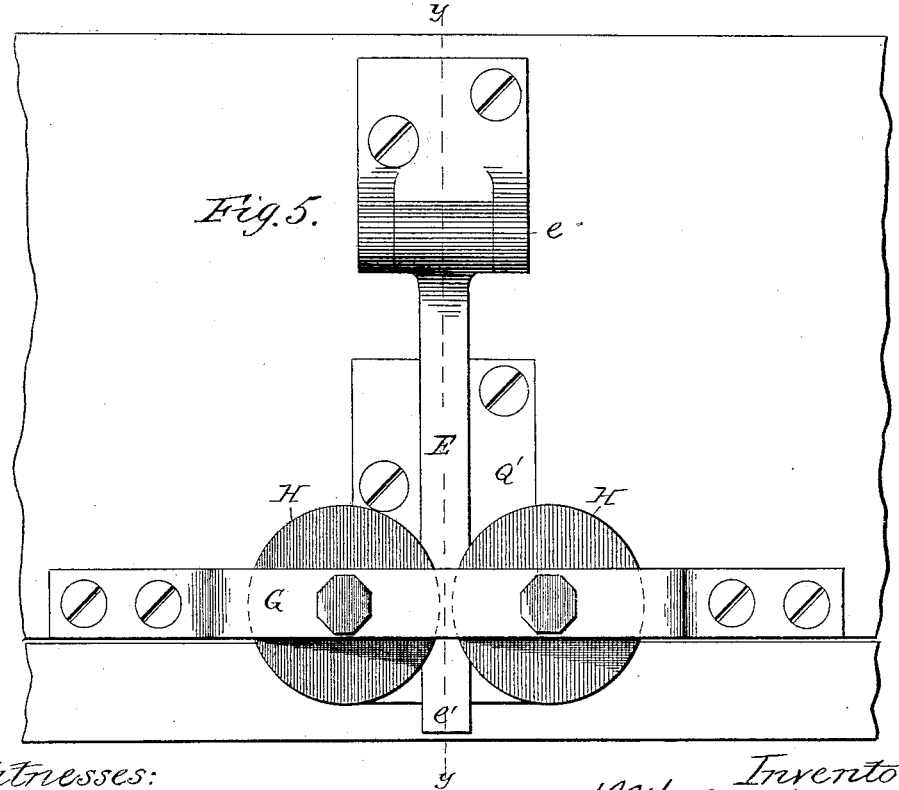

United States Patent Office.

WILLIAM A. HOLLEY AND ULRIK MALIN, OF HOLLAND, MICHIGAN.

ELECTRO-MAGNETIC GRAIN-SCALE.

SPECIFICATION forming part of Letters Patent No. 397,594, dated February 12, 1889.

Application filed May 26, 1888. Serial No. 275,238. (No model.)

*To all whom it may concern:*

Be it known that we, WILLIAM A. HOLLEY, a citizen of the United States, and ULRIK MALIN, a subject of the Czar of Russia, residing at Holland, in the county of Ottawa and State of Michigan, have invented certain new and useful Improvements in Electro-Magnetic Weighing-Scales; and we do hereby declare the following to be a full, clear, and exact description of the invention, such as will enable others skilled in the art to which it appertains to make and use the same.

Our invention relates more especially to improvements upon the electro-magnetic weighing-scales for which Letters Patent No. 377,383 were granted to us February 7, 1888, wherein the weight of the feed, flour, grain, or other material upon the scale is employed to control the discharge-valve detents through an electric circuit and magnets, whereby the discharge-valves are opened by the weight of the grain.

The object of our present invention is to provide improved means for electrically actuating the discharge-valve detent, for electrically closing the supply-valve when the scale has received the proper weight of stock or material, for concurrently operating the discharge-valve and controlling the supply of material to the scale by mechanism actuated by and co-operating with the electrically-actuated discharge-valve detent, and for mechanically locking and holding the valve of the supply-spout closed until the discharge-valve is completely closed and securely held by its detent.

The improvement consists in the construction and arrangement or combination of parts hereinafter particularly disclosed in the description, drawings, and claims, reference being made to said drawings, wherein the same letters refer to the same or corresponding parts, and in which—

Figure 1:
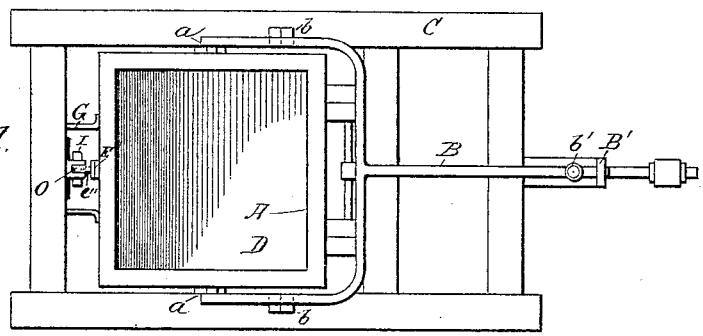
Figure 2:
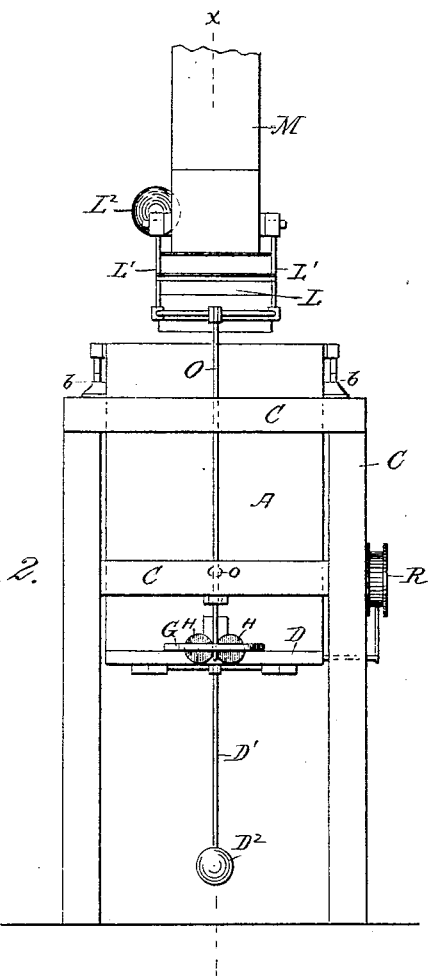

Figure 1 represents a plan view of that part of the apparatus beneath the supply-spout and valve; Fig. 2, an end elevation of the apparatus; Fig. 3, a sectional elevation of the same on the line $x$ $x$ of Fig. 2, illustrating our invention in its general features. Fig. 4 is an enlarged detail plan; Fig. 5, a similar end elevation, and Fig. 6 a similar partly-sectional elevation on line $y$ $y$ of Figs. 4 and 5 of the electro-magnets and their connections with the discharge-valve detent and supply-valve-operating mechanism.

A receptacle or hopper, A, is suspended at $a$ upon the short arms of a scale-beam, B, which are fulcrumed at $b$ upon a rectangular frame, C, of any well-known or preferred construction. A discharge-valve, D, hinged to the hopper at $d$, forms the bottom thereof, and an arm, D', projecting from said valve, carries an adjustable counterbalance-weight, $D^2$, which serves to close said valve or bottom of the hopper when the material has been discharged therefrom. A detent, E, hinged to the hopper at $e$, has a hook, $e'$, at its lower end, which engages with a plate, $d'$, projecting from the swinging end of the discharge-valve, and serves to hold said valve normally closed against the weight of the material within the hopper.

The hopper A fits snugly between the side pieces of the frame, and is prevented from swinging, and is yet permitted to rise and fall to a limited extent by a stay-hook, F, which is swiveled to one end of the frame; also, said hopper is prevented from falling below a given point by a guide and stop plate, B', which is secured to one end of the frame and receives the end of the long arm of the scale-beam B. A bracket, G, which is secured to the front of the hopper opposite the hook F, carries a pair of electro-magnets, H, which are held in close proximity to an armature, I, which is secured to and projects from the lower end of the detent E by means of a stud, $e''$. This armature is always held properly within the field of the electro-magnets by means of the stay-hook F and stop-plate B', above described, while the hopper is permitted to rise and fall a suitable distance to move the scale-beam.

The electro-magnets H are placed in the circuit of an electric battery, H', the terminals $H^2$ $H^3$ of which are secured, respectively, to a platinum contact-plate, K, which is secured upon the frame, and to a similar plate, K', secured to the hopper, so as to rise and fall therewith and close the circuit when the hopper is down and open said circuit when the hopper is in its raised position. Under this construction, when the hopper is down and the circuit closed, the electro-magnets H will attract the armature I and withdraw the detent E from engagement with the swinging end of the discharge-valve D, thus permitting the weight of the material to open said valve and discharge the contents of said hopper; also, when the hopper has become empty, the counterbalance-weight $D^2$ will close said discharge-valve and the scale-beam weight $b'$ will raise said hopper until electrical contact is broken between the plates K K', thus releasing the armature I and detent E, which latter will then be permitted to move back into position to engage with the swinging end of the discharge-valve and secure it in its closed position against the weight of the entering material.

In order that the supply of material to the hopper may be cut off from the moment the hopper begins to descend until the material is discharged therefrom and the discharge-valve is again returned and securely held by the detent E, a supply-valve, L, is secured to crank-arms L', pivoted to the supply-spout M, and connected by a link, N, with the upper end of an upright lever, O, which is pivoted to the frame at $o$ and operated upon by the electro-magnets concurrently with their action upon the armature and the discharge-valve detent to release the latter when the material is to be discharged from the hopper. The lower end of this lever O passes through a hole, $o'$, in the armature I, and consequently will be drawn forward toward the electro-magnets as long as the circuit is closed, and at the same time its upper end, which is connected by link N to the crank-arms L', will close the supply-valve L and hold it closed as long as the electric circuit is closed and the discharge-valve of the hopper is open. A counterbalance-weight, $L^2$, upon one of the crank-arms L' serves to open the supply-valve L and release the armature I and the discharge-valve detent E from the magnets H when the electric circuit is broken by the upward movement of the hopper.

A lock-lever, P, is pivoted upon a rod, P', which is supported in the lower ends of two arms, Q, projecting from a plate, Q', secured in a recess formed in the front of the hopper. This lock-lever, as shown in Figs. 4 and 6, consists of a front transverse portion, $p$, having a plane upper surface and two rearwardly-extending arms, $p'$. The rear ends of these lock-lever arms project into inclined recesses $q$, formed in the lower edge of the plate Q', as shown in Fig. 6, while the front transverse portion, $p$, is adapted to rest either beneath the armature I or in angular recess $i$ between the rear edge of the same and the lower side of the stud $e''$.

Under the construction and arrangement of the parts just described, when the electro-magnets and armature release the detent E from the discharge-valve D and move the lower end of the pivoted lever O forward and its upper end and its connections N L' rearward, the lock-lever P will move into the angular recess $i$ and hold the supply-valve L firmly closed until the discharge-valve D is raised to its closed position. In closing the discharge-valve the front edge of the plate $d'$ impinges against and raises the rear ends of the arms $p'$ of the lock-lever P and lowers and releases its front portion, $p$, from the angular recess $i$, and thus permits the armature I, the lower end of the lever O, and the detent E to move backward and allow the supply and discharge valves to be respectively opened and closed, thus preventing the material from the supply-spout from entering the hopper and falling through the discharge-valve opening before the said valve is completely closed by its counterbalance-weight and secured by its detent. The material passing through the apparatus is thus automatically and accurately weighed, each movement of the hopper and scale-beam serving to alternately open and close communication concurrently with precision and promptness between the supply-spout and hopper and between the hopper and the discharge-valve by means of the electro-magnets and their connections.

A registering device, R, of any well-known or preferred construction, is secured to the frame or hopper and connected with the discharge-valve, so as to record the quantity or weight of the material passing through the apparatus.

It will be obvious from the foregoing that this construction and arrangement or combination of the hopper, valve, detent, lock-lever, magnets, and electric circuit can be employed in connection with any well-known or ordinary form of scale, and therefore we do not limit ourselves to the employment of the particular construction of scale and frame herein disclosed; also, it will be obvious that minor changes in the details of construction and arrangement of the several parts of our invention can be made without departing from the nature or principle thereof.

Having thus fully described our invention, what we claim as new is—

1. The combination, in an electro-magnetic weighing-scale, of a frame, a scale-beam, a hopper supported thereby, a counterbalanced discharge-valve, a detent upon the hopper, electro-magnets, an armature secured to said detent, an electric circuit, and contact-points located, respectively, upon said hopper and frame, substantially as described.

2. The combination, in an electro-magnetic weighing-scale, of a frame, a scale-beam, a vertically-movable hopper supported thereon, a discharge-valve hinged to said hopper, a stay-hook connecting one side of said vertically-movable hopper with said frame, a discharge-valve detent and electro-magnets located upon the opposite side of said hopper, and an armature held within the field of said magnets, substantially as described.

3. The combination, in an electro-magnetic weighing-scale, of a frame, C, a scale-beam, B, a hopper, A, supported upon said scale-beam, a supply-spout, M, a counterbalanced supply-valve, L, crank-arms L', upright lever O, link N, electro-magnets H, and contact-plates K K', located, respectively, upon said frame and hopper, substantially as described.

4. The combination, in an electro-magnetic weighing-scale, of a frame, a scale-beam, a hopper, a supply spout and valve, a discharge-valve upon the hopper, a discharge-valve detent, electro-magnets for operating said detent, and a lever-connection between the armature of said electro-magnets and supply-valve for electrically actuating the same, substantially as described.

5. The combination, in an electro-magnetic weighing-scale, of the frame C, the hopper A, the scale-beam B, the discharge-valve D, the valve-detent E, the armature I, secured thereto, the electro-magnets H, arranged in a circuit controlled by said scale-beam, the supply-valve L, the crank-arms L', the link N, and the rod O, all arranged for joint operation substantially as described.

6. The combination, in an electro-magnetic weighing-scale, of a hopper, a supply-valve, a discharge-valve, a discharge-valve detent, electro-magnets for operating the same, a lever-connection between said supply-valve and discharge-valve detent, and a lock-lever adapted to lock said supply-valve until the discharge-valve detent is in working position, substantially as described.

7. The combination, in an electro-magnetic weighing-scale, of the hopper A, the supply-valve L, the discharge-valve D, the detent E, the armature I and stud $e''$, arranged to form the angular recess $i$, the electro-magnets H, the lever-connections O, N, and L', the plate Q', having arms Q and inclined recesses $q$, the rod P', and the lock-lever P, consisting of the front transverse portion, $p$, and the rearwardly-extending arms $p'$, substantially as described.

In testimony whereof we affix our signatures in presence of two witnesses.

WILLIAM A. HOLLEY.
ULRIK MALIN.

Witnesses:
C. J. DE ROO,
A. G. HUIZINGA.